(12) United States Patent
Rutherford

(10) Patent No.: US 7,471,482 B2
(45) Date of Patent: Dec. 30, 2008

(54) METHOD FOR IMPROVED INSITU SPIRAL WRITING

(75) Inventor: David Rutherford, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 93 days.

(21) Appl. No.: 11/541,977

(22) Filed: Oct. 2, 2006

(65) Prior Publication Data

US 2007/0195450 A1  Aug. 23, 2007

Related U.S. Application Data

(60) Provisional application No. 60/775,210, filed on Feb. 20, 2006.

(51) Int. Cl.
*G11B 21/02* (2006.01)
(52) U.S. Cl. .......................................... 360/75
(58) Field of Classification Search ............ None
See application file for complete search history.

(56) References Cited

U.S. PATENT DOCUMENTS

| | | | |
|---|---|---|---|
| 4,531,167 A | | 7/1985 | Berger |
| 6,040,955 A | * | 3/2000 | Brown et al. ............... 360/75 |
| 6,344,942 B1 | * | 2/2002 | Yarmchuk ................... 360/75 |
| 6,603,627 B1 | | 8/2003 | Chainer et al. |
| 6,643,082 B1 | | 11/2003 | Belser |
| 7,116,510 B2 | * | 10/2006 | Yamamoto ................... 360/75 |
| 2002/0105751 A1 | | 8/2002 | Yasuna et al. |
| 2004/0150903 A1 | | 8/2004 | Malone, Sr. |
| 2004/0160696 A1 | | 8/2004 | Meyer |
| 2005/0068658 A1 | | 3/2005 | Yamamoto |

* cited by examiner

*Primary Examiner*—K. Wong

(57) ABSTRACT

A system includes a self-servo-write (SSW) module and a control module. The SSW module generates servo signals and a control signal. The control module generates a first current to bias an actuator arm against a spring when the control signal is received and discontinues the first current to release the spring and accelerate the actuator arm when the SSW module generates the servo signals.

31 Claims, 13 Drawing Sheets

METHOD FOR IMPROVED INSITU SPIRAL WRITING

CROSS-REFERENCE TO RELATED APPLICATIONS

This application claims the benefit of U.S. Provisional Application No. 60/775,210, filed on Feb. 20, 2006. The disclosure of the above application is incorporated herein by reference in its entirety.

FIELD

The present disclosure relates to hard disk drives (HDDs), and more particularly to writing servo on HDDs.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Electronic devices such as computers, laptops, personal video recorders (PVRs), MP3 players, game consoles, set-top boxes, digital cameras, etc., often need to store a large amount of data. Storage devices such as hard disk drives (HDDs) may be used to meet these storage requirements.

Referring now to FIG. 1, a hard disk drive (HDD) 10 includes a hard disk assembly (HDA) 50 and a HDA printed circuit board (PCB) 14. The HDA PCB 14 comprises a buffer module 18 that stores data associated with the control of the HDD 10. The buffer module 18 may employ SDRAM or other types of low latency memory. A processor 22 is arranged on the HDA PCB 14 and performs processing that is related to the operation of the HDD 10.

A hard disk controller (HDC) module 26 communicates with the buffer module 18, the processor 22, a spindle/VCM (voice coil motor) driver module 30, and an input/output interface module 24. The input/output interface module 24 can be a serial interface module, a parallel interface module, a serial Advance Technology Attachment (ATA) interface module, a parallel ATA interface module, etc.

Additionally, the HDC module 26 communicates with a read/write channel module 34. During write operations, the read/write channel module 34 encodes data that is to be written by a read/write device 59. The read/write channel module 34 processes data for reliability using error correction coding (ECC), run length limited coding (RLL), etc. During read operations, the read/write channel module 34 converts an analog output of the read/write device 59 into a digital signal. The digital signal is then detected and decoded using known techniques to recover the data written on the HDD 10.

The HDA 50 includes one or more circular recording surfaces called platters 52 that are used to store data. The platters 52 include a magnetic coating for storing data in terms of magnetic fields. The platters 52 are stacked on top of one another in the form of a spindle. The spindle comprising the platters 52 is rotated by a spindle motor 54. Generally, the spindle motor 54 rotates the platters 52 at a fixed speed during read/write operations. The spindle/VCM driver module 30 controls the speed of the spindle motor 54.

One or more actuator arms 58 move relative to the platters 52 during read/write operations. The spindle/VCM driver module 30 also controls the positioning of the actuator arm 58 by using mechanisms such as a voice coil actuator, a stepper motor, etc. For example, a voice coil motor (VCM) 57, which is controlled by the spindle/VCM driver module 30, may be used to control the positioning of the actuator arm 58.

The read/write device 59 is located near a distal end of the actuator arm 58. The read/write device 59 includes a write element such as an inductor (not shown) that generates a magnetic field. The read/write device 59 also includes a read element (such as a magneto-resistive (MR) element, also not shown) that senses magnetic field on the platters 52. The HDA 50 includes a preamp module 60, which amplifies analog read/write signals.

When reading data, the preamp module 60 amplifies low-level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored on the hard drive platters 52 and is used to represent data.

Referring now to FIG. 2, data is typically written on the platters 52 in concentric circles called tracks 70. The tracks 70 are divided circumferentially into multiple sectors 72. A circumferential length 74 of sectors 72 decreases as the diameter of the tracks 70 decreases towards the center of the platters 52.

Before performing a read/write operation on a sector 72 of a track 70, the read/write device 59 locks onto the track 70 by referring to positioning information called servo. Servo is generally prewritten on the platters 52 and provides the positioning information to allow the read/write device 59 to read and write data at correct locations on the platters 52.

Data can be correctly read and/or written if servo is written accurately. Traditionally, servo is prewritten using a special servo writing apparatus when a disk drive is manufactured. The servo writing apparatus typically includes a precision actuator used to position an actuator arm. The servo writing apparatus also typically uses an external clock-head to position servo wedges at a predetermined offset. Accordingly, the servo writing apparatus can be expensive and may increase the cost of manufacturing HDDs.

Additionally, traditional servo writing methods become less practical as the track density of disk drives increases. Track density is generally expressed in terms of number of tracks per inch of the platters 52. The track density may increase due to two reasons: decreasing diameter of platters 52 and increasing storage capacity of disk drives. In recent years, the physical size of disk drives is decreasing, and the storage capacity of disk drives is increasing. This is because of growing demand for smaller devices such as palmtops, etc., that use disk drives that are compact in size and high in storage capacity.

Accordingly, HDDs increasingly use self-servo-write (SSW) methods to write their own servo instead of using external servo writing apparatus. Disk drives that use SSW methods to write servo utilize the same read/write heads that are used to read/write regular data. When writing servo using SSW methods, the heads typically lock onto reference servo sectors (RSS) that are prewritten on the platters 52 either concentrically or in the form of spirals.

Referring now to FIGS. 3A-3B, a SSW module 28 may communicate with the processor 22 and the HDC module 26 as shown in FIG. 3A. The SSW module 28 may generate control signals to write servo on platters 52. For example, the SSW module 28 may generate control commands that control movement of the actuator arm 58 during servo writing. The HDC module 26 and the spindle/VCM driver module 30 may implement the control commands during SSW. The SSW module 28 may generate a servo pattern that is written on the platters 52 using the read/write device 59. Additionally, the SSW module 28 may utilize the processor 22 to verify the servo pattern by performing read-after-write operations, etc.

During SSW, the platters 52 may rotate in direction A, and the actuator arm 58 may move in direction B as shown in FIG. 3B. A disk drive typically uses motion delimiters called crashstops that prevent the actuator arm 58 from moving beyond safe limits. For example, the VCM 57 causes the actuator arm 58 to move between crashstop 55 and crashstop 53 while the read/write device 59 writes a servo spiral 80 between tracks 70.

When spirals 80 are written, the actuator arm 58 is accelerated from a stationary position to a predetermined velocity by applying current to the VCM 57. Spirals 80 are written accurately when the actuator arm 58 moves at the predetermined velocity. Thus, spirals 80 that are written while the actuator arm 58 accelerates may be imperfect, that is, the spirals 80 may have wrong slopes. The portion of platters 52 where spirals 80 are imperfectly written may be unusable, which may reduce storage capacity of HDDs.

SUMMARY

A system comprises a self-servo-write (SSW) module and a control module. The SSW module generates servo signals and a control signal. The control module generates a first current to bias an actuator arm against a spring when the control signal is received and discontinues the first current to release the spring and accelerate the actuator arm when the SSW module generates the servo signals.

In another feature, the spring exerts a force on the actuator arm when the spring is released.

In another feature, the force accelerates the actuator arm to a predetermined velocity.

In another feature, the control module generates a second current that biases the actuator arm away from the spring when the first current is discontinued and that moves the actuator arm at a predetermined velocity after the actuator arm accelerates to the predetermined velocity. The second current is of opposite polarity relative to the first current.

In another feature, the first current is calculated based on a spring constant of the spring and a predetermined velocity that the actuator arm accelerates to when the spring is released.

In another feature, the actuator arm comprises a read/write device that writes servo on a magnetic medium of a disk drive based on the servo signals while the actuator arm accelerates and subsequently moves at a predetermined velocity.

In another feature, the spring communicates with one of an inner diameter (ID) crashstop and an outer diameter (OD) crashstop and wherein the read/write device begins writing the servo adjacent to one of the ID crashstop and the OD crashstop.

In another feature, the read/write device comprises a read element and a write element, wherein the read element reads servo written by the write element.

In another feature, the read element is separated from the write element by a predetermined distance and wherein the control module calculates a spring constant of the spring based on current that biases the actuator arm against the spring by the predetermined distance.

In another feature, the system further comprises a voice coil motor (VCM) that moves the actuator arm based on current applied by the control module.

In another feature, a hard disk controller (HDC) module comprises the system.

In another feature, a hard disk assembly (HDA) comprises the system.

In still other features, a method comprises generating servo signals and a control signal, generating a first current to bias an actuator arm against a spring when the control signal is received, discontinuing the first current to release the spring, and accelerating the actuator arm when the servo signals are generated.

In another feature, the method further comprises exerting a force on the actuator arm when the spring is released and accelerating the actuator arm to a predetermined velocity.

In another feature, the method further comprises generating a second current to bias the actuator arm away from the spring when the first current is discontinued and moving the actuator arm at a predetermined velocity after the actuator arm accelerates to the predetermined velocity. The second current is of opposite polarity relative to the first current.

In another feature, the method further comprises calculating the first current based on a spring constant of the spring and a predetermined velocity that the actuator arm accelerates to when the spring is released.

In another feature, the method further comprises writing servo on a magnetic medium of a disk drive based on the servo signals while the actuator arm accelerates and subsequently moves at a predetermined velocity.

In another feature, the method further comprising communicating between the spring and one of an inner diameter (ID) crashstop and an outer diameter (OD) crashstop and beginning writing the servo adjacent to one of the ID crashstop and the OD crashstop.

In another feature, the method further comprises writing the servo with a write element, reading the servo with a read element, and calculating a spring constant of the spring based on current that biases the actuator arm against the spring by a predetermined distance that separates the read and write elements.

In another feature, the method further comprises applying current to the actuator arm and moving the actuator arm based on the current.

In still other features, a system comprises self-servo-write (SSW) means for generating servo signals and a control signal. The system further comprises control means for generating a first current when the control signal is received and discontinuing the first current when the SSW means generates the servo signals. The first current biases an actuator arm against spring means for accelerating the actuator arm. The spring means releases and accelerates the actuator arm when the first current is discontinued.

In another feature, the spring means exerts the force on the actuator arm when the spring means is released and wherein the force accelerates the actuator arm to a predetermined velocity.

In another feature, the control means generates a second current that biases the actuator arm away from the spring means when the first current is discontinued and that moves the actuator arm at a predetermined velocity after the actuator arm accelerates to the predetermined velocity. The second current is of opposite polarity relative to the first current.

In another feature, the first current is calculated based on a spring constant of the spring means and a predetermined velocity that the actuator arm accelerates to when the spring means is released.

In another feature, the actuator arm comprises write means for writing servo on a magnetic medium of a disk drive based on the servo signals while the actuator arm accelerates and subsequently moves at a predetermined velocity.

In another feature, the system further comprising an inner diameter (ID) crashstop means for preventing the actuator arm from moving beyond the ID and an outer diameter (OD) crashstop means for preventing the actuator arm from moving beyond the OD, wherein the spring means communicates with one of the ID and OD crashstop means, and wherein the read/write device begins writing the servo adjacent to one of the ID and OD crashstop means.

In another feature, the actuator arm further comprises read means for reading the servo, wherein the read means is separated from the write means by a predetermined distance.

In another feature, the control means calculates a spring constant of the spring means based on current that biases the actuator arm against the spring by the predetermined distance.

In another feature, the system further comprises voice coil motor (VCM) means for moving the actuator arm based on current applied by the control means.

In another feature, a hard disk controller (HDC) means for controlling a hard disk, wherein the HDC means comprises the system.

In another feature, a hard disk assembly (HDA) comprises the system.

In still other features, a computer program executed by a processor comprises generating servo signals and a control signal, generating a first current to bias an actuator arm against a spring when the control signal is received, and discontinuing the first current to release the spring and to accelerate the actuator arm when the servo signals are generated.

In another feature, the computer program further comprises exerting a force on the actuator arm when the spring is released and accelerating the actuator arm to a predetermined velocity with the force.

In another feature, the computer program further comprises generating a second current that biases the actuator arm away from the spring when the first current is discontinued and moving the actuator arm at a predetermined velocity after the actuator arm accelerates to the predetermined velocity. The second current is of opposite polarity relative to the first current.

In another feature, the computer program further comprises calculating the first current based on a spring constant of the spring and a predetermined velocity that the actuator arm accelerates to when the spring is released.

In another feature, the computer program further comprises writing servo on a magnetic medium of a disk drive based on the servo signals while the actuator arm accelerates and subsequently moves at a predetermined velocity.

In another feature, the computer program further comprising communicating between the spring and one of an inner diameter (ID) crashstop and an outer diameter (OD) crashstop and beginning writing the servo adjacent to one of the ID crashstop and the OD crashstop.

In another feature, the computer program further comprises writing the servo with a write element, reading the servo with a read element, and calculating a spring constant of the spring based on current that biases the actuator arm against the spring by a predetermined distance that separates the read and write elements.

In another feature, the computer program further comprises applying current to the actuator arm and moving the actuator arm based on the current.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
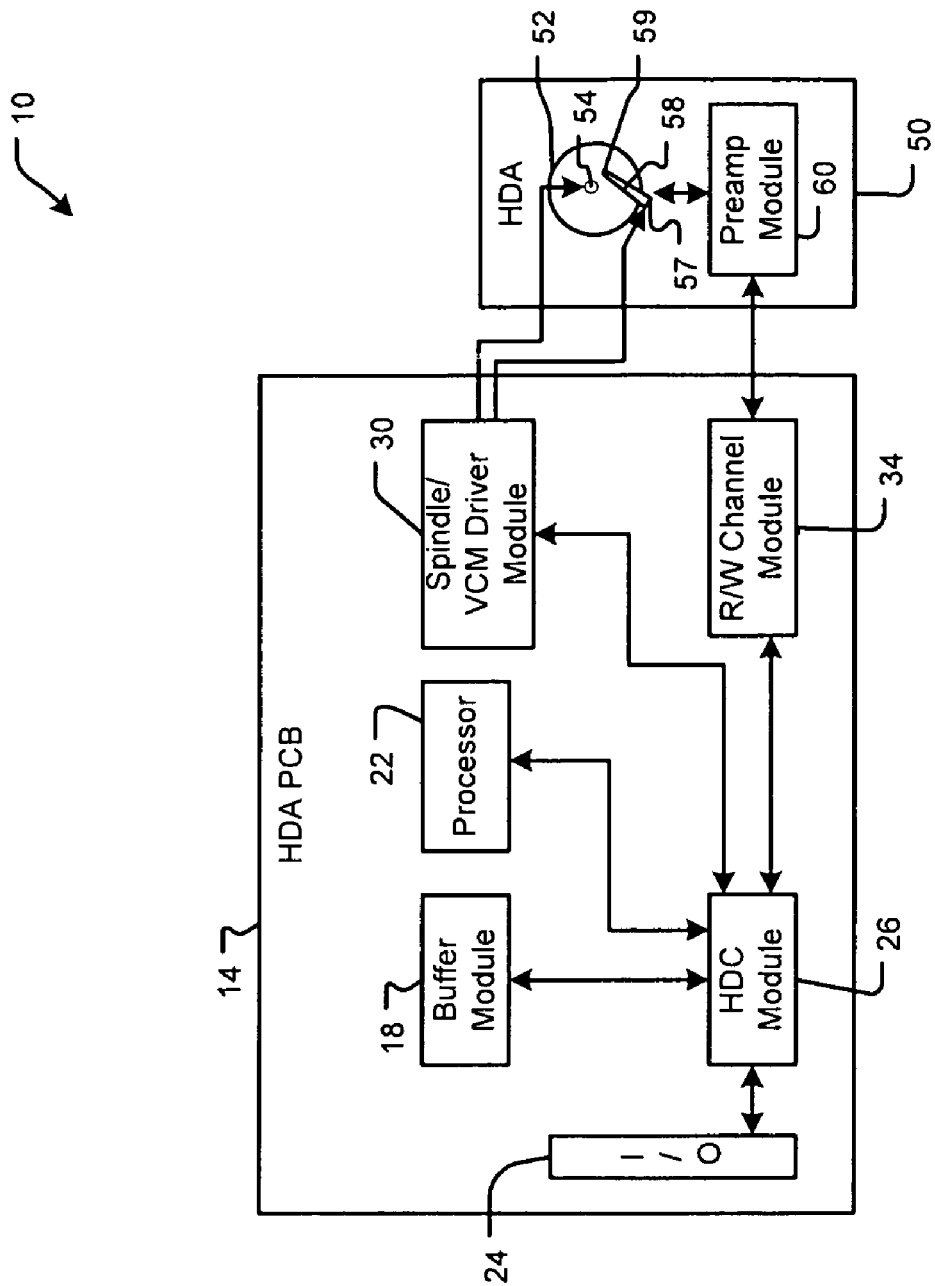
FIG. 1 is a functional block diagram of a disk drive according to the prior art.
Figure 2:
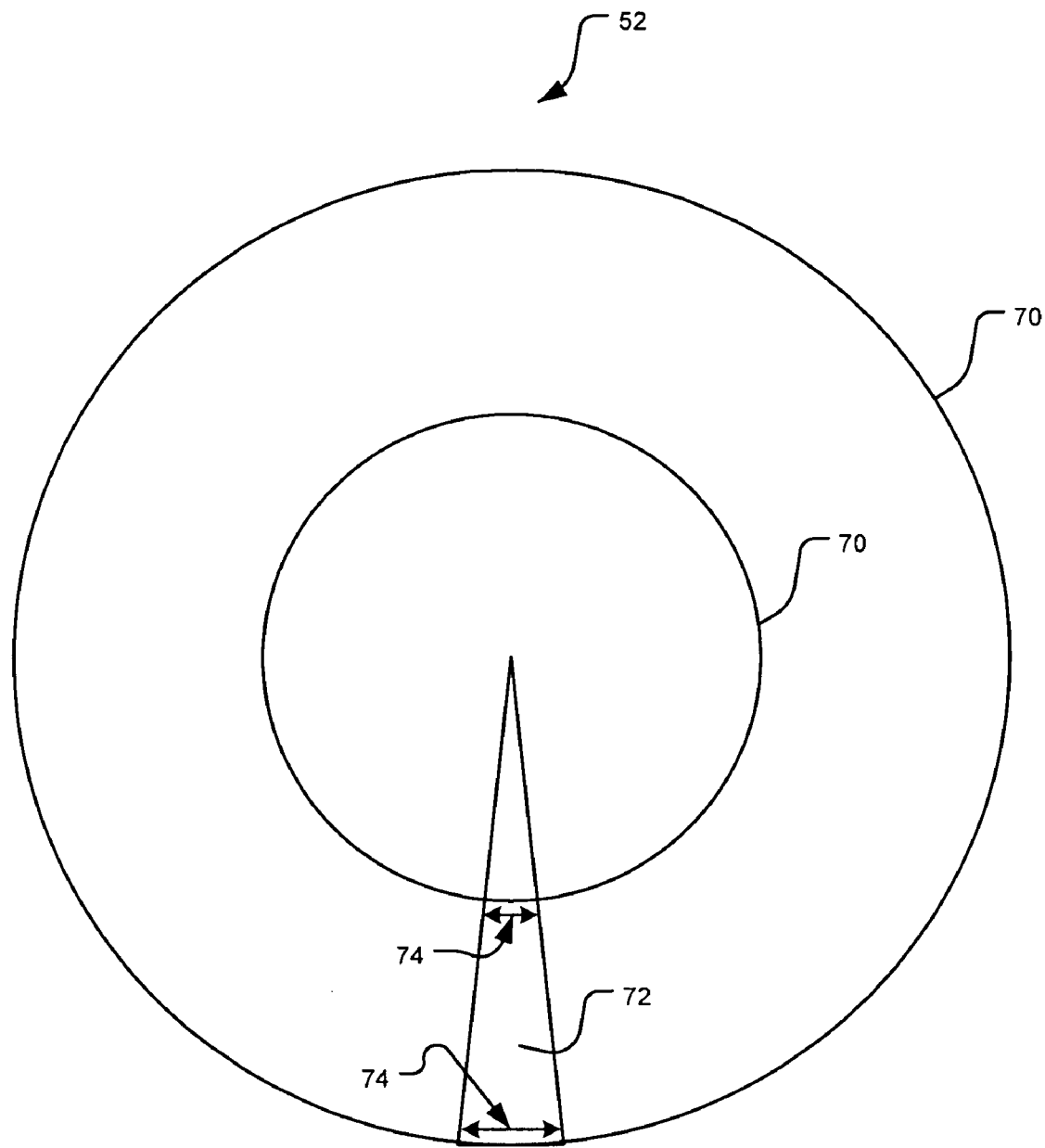
FIG. 2 is a schematic representation of tracks and sectors of disk drives according to the prior art.
Figure 3A:
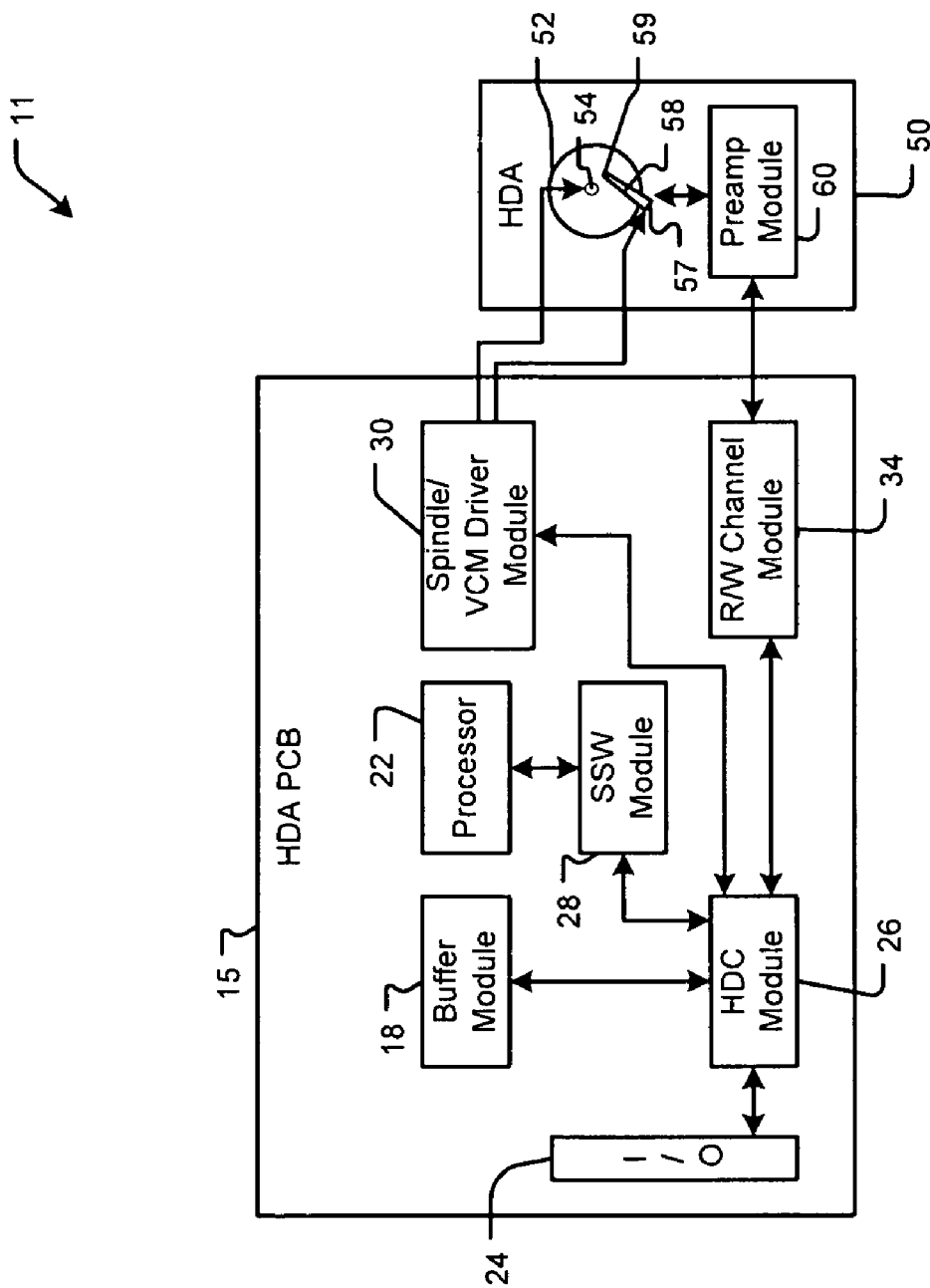
FIG. 3A is a functional block diagram of a disk drive that employs self-servo-write methods according to the prior art.
Figure 3B:
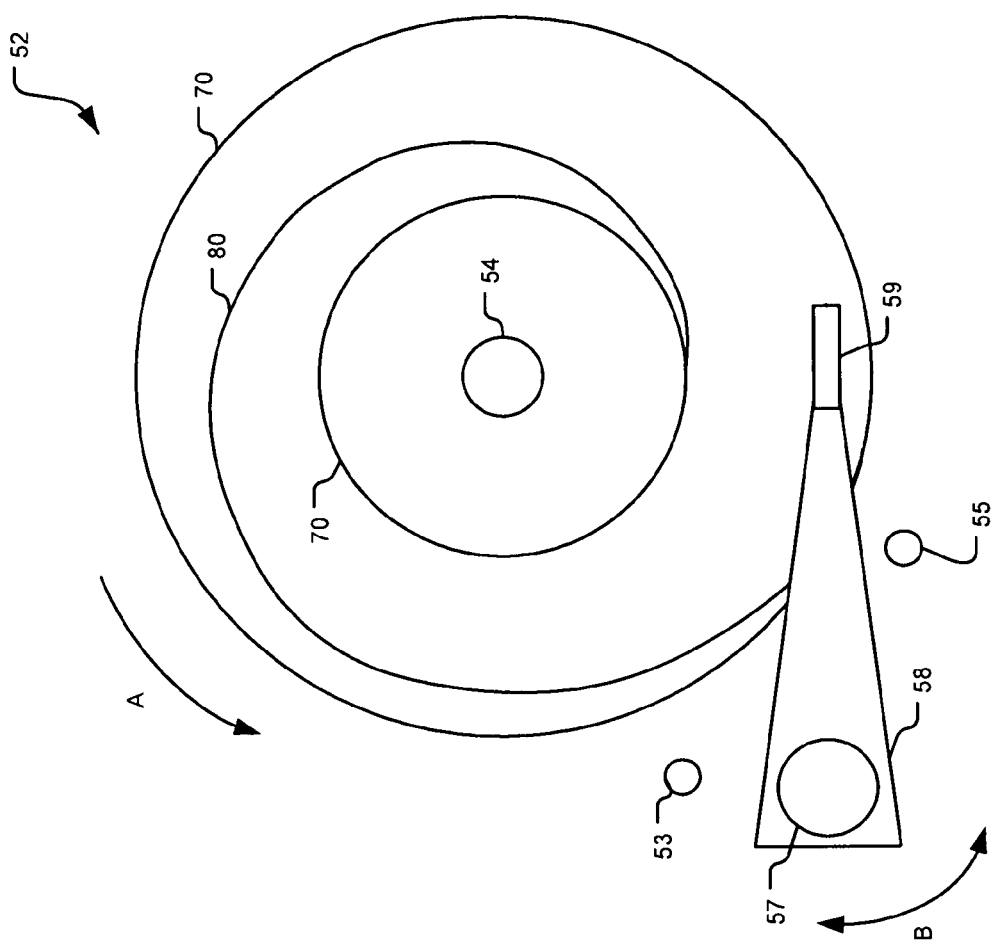
FIG. 3B is a schematic representation of writing servo spirals according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 4:
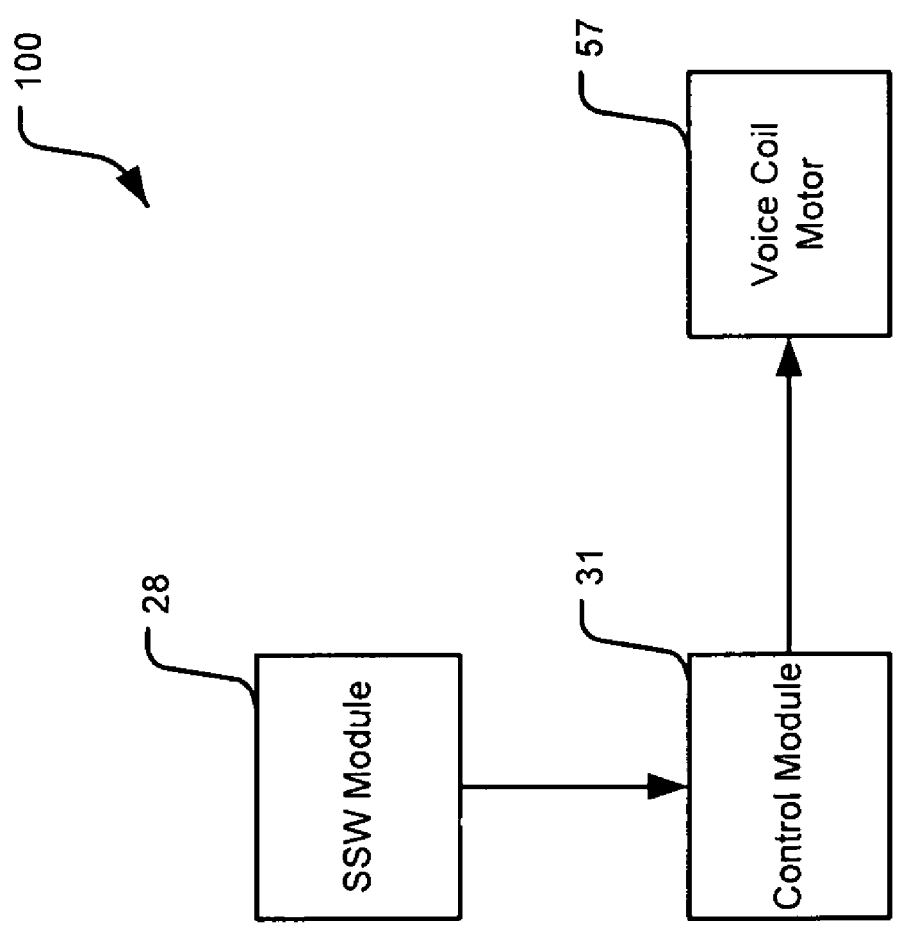
FIG. 4 is a functional block diagram of an exemplary system for accelerating an actuator arm when writing servo spirals according to the present disclosure.
Figure 5:
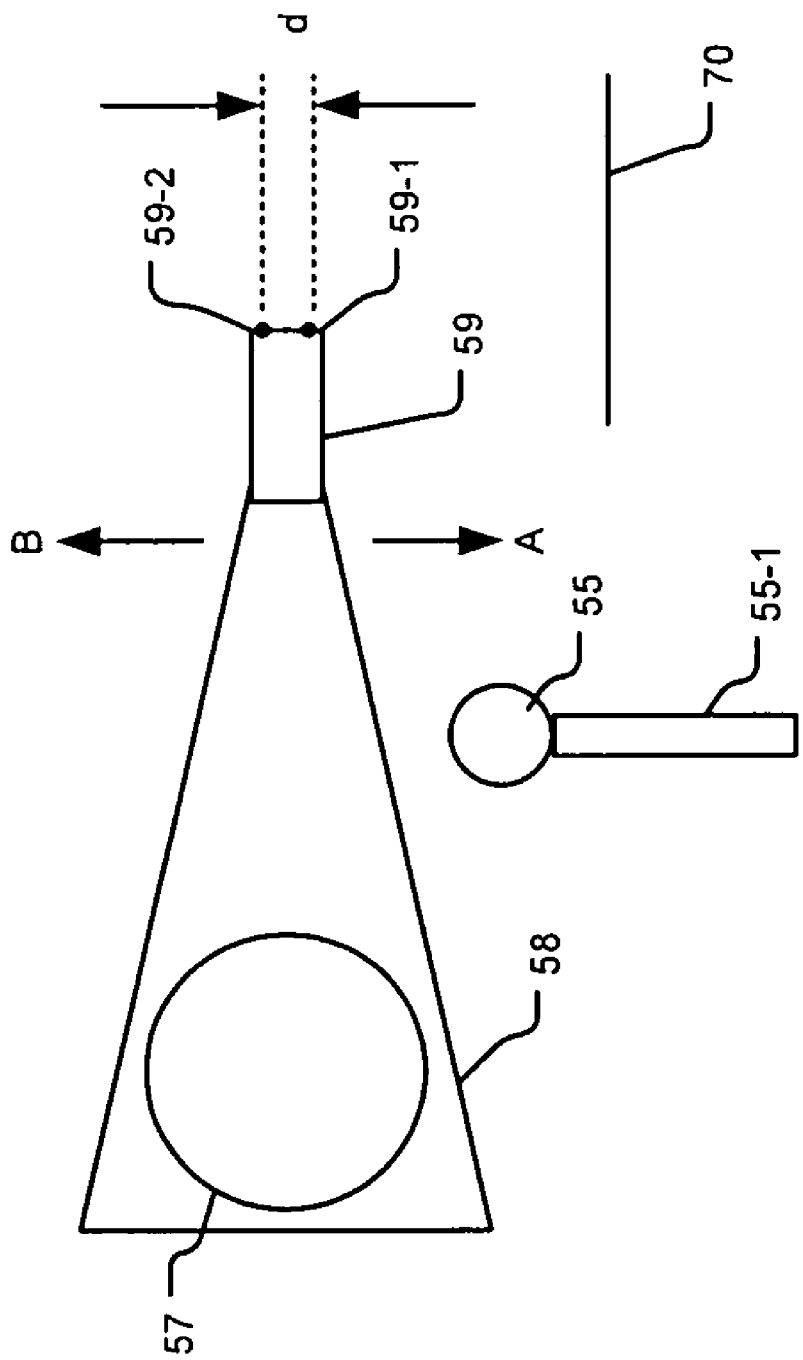
FIG. 5 is a schematic representation of an exemplary system for accelerating an actuator arm when writing servo spirals according to the present disclosure.

Imperfections in writing servo spirals during self-servo-write (SSW) may be reduced by quickly accelerating an actuator arm to a predetermined velocity. Referring now to FIGS. 4 and 5, a system 100 for writing servo spirals comprises a SSW module 28, a control module 31, and a voice coil motor (VCM) 57. The SSW module 28 generates servo signals. The SSW module 28 generates a control signal that activates the control module 31 before SSW begins. The control module 31 controls the movement of an actuator arm 58 by controlling the VCM 57 during SSW. A read/write device 59 mounted at a distal end of the actuator arm 58 writes servo spirals based on the servo signals during SSW operations.

Additionally, the system 100 utilizes a crashstop spring 55-1 to accelerate the actuator arm 58 to a target velocity. The target velocity is a predetermined velocity of the actuator arm 58 at which the read/write device 59 writes servo spirals on platters (not shown).

When activated, the control module 31 initially applies a first current to the VCM 57 so that the actuator arm 58 moves in direction A and presses against the crashstop 55. This compresses the crashstop spring 55-1. Before the read/write device 59 begins to write a servo spiral, the control module 31 discontinues or removes the first current. Simultaneously, the control module 31 applies a second current called a bias current to the VCM 57. The second current biases or moves the actuator arm 58 in direction B, which is opposite of direction A.

Discontinuing the first current causes the crashstop spring 55-1 to suddenly decompress or release. The sudden decompression or release of the crashstop spring 55-1 exerts a force on the actuator arm 58. The force quickly accelerates the actuator arm 58 to the target velocity.

The acceleration generated by the decompression of the crashstop spring 55-1 is generally greater than the acceleration that can be generated by a small bias current. Additionally, the acceleration generated by the decompression of the crashstop spring 55-1 is generally more controlled than the acceleration that may be produced by a large bias current. That is, a bias current that may generate acceleration similar to the acceleration generated by the decompression of the crashstop spring 55-1 may create mechanical and thermal transients, which may degrade repeatability of motion of the actuator arm 58 over time.

After the actuator arm 58 has accelerated to the target velocity, the bias current continues to move the actuator arm 58 at the target velocity. The bias current is predetermined to provide approximately zero net acceleration at a given radius. The read/write device 59 writes servo spirals while the actuator arm 58 quickly accelerates and subsequently continues to move at the target velocity.

Since the actuator arm 58 quickly accelerates to the target velocity, the read/write device 59 can begin writing perfect spirals close to the crashstop 55. That is, the read/write device 59 can begin writing perfect spirals close to the crashstop 55 when crashstop spring 55-1 is used to accelerate the actuator arm 58. Consequently, the area on the platters 52 (not shown) that may be usable due to perfectly written spirals is increased.

Accelerating the actuator arm 58 to the target velocity using the crashstop spring 55-1 can be mathematically explained as follows. The crashstop spring 55-1 acts as a linear spring. When the control module 31 applies the first current, the actuator arm 58 compresses the crashstop spring 55-1. The crashstop spring 55-1 stores energy $E_s$.

When the control module 31 discontinues the first current, the crashstop spring 55-1 decompresses. The energy $E_s$ stored in the crashstop spring 55-1 is converted into kinetic energy $E_k$. Additionally, the control module 31 simultaneously applies the bias current to the VCM 57, which moves the actuator arm 58 in the opposite direction. The kinetic energy $E_k$, when applied to the actuator arm 58, accelerates the actuator arm 58 to the target velocity.

Let $I_{compression}$ denote the first current in Amperes that is used to compress the crashstop spring 55-1. Additionally, let $K_{spring}$ denote a spring constant of the crashstop spring 55-1 in Newton-Meters, and let $K_t$ denote a force constant of the VCM 57 in Newton-Meters/Amperes. A compression distance x by which the crashstop spring 55-1 is compressed when the first current $I_{compression}$ is applied to the VCM 57 is calculated using the following equation.

$$\text{Spring Force} = x * K_{spring} = K_t * I_{compression}$$

Solving the equation for x, we get $$x = (K_t / K_{spring}) * I_{compression}$$

According to the law of conservation of energy, energy $E_s$ stored in the crashstop spring 55-1 is equal to kinetic energy $E_k$ generated by the decompression of the crashstop spring 55-1 when the control module 31 discontinues the first current $I_{compression}$. Energy $E_s$ stored in the crashstop spring 55-1 is given by $E_s = (x^2 * K_{spring})/2$. The kinetic energy $E_k$ generated by the decompression of the crashstop spring 55-1 is given by $E_k = (w^2 * J)/2$, where w is an angular velocity of the actuator arm 58 in radians/second, and J is moment of inertia of the actuator arm 58.

$E_s = E_k$ gives $(x^2 * K_{spring})/2 = (w^2 * J)/2$. Solving the equation for w, we get current that compresses the crashstop spring 55-1 by a known value of d, in case where read and write elements are in line. Suppose the write element 59-1 and the read element 59-2 are oriented or positioned on the read/write device 59 in the order shown in FIG. 5. In that case, the control module 31 initially applies a test current to the VCM 57 so that the actuator arm 58 moves slightly in direction A and lightly compresses the crashstop spring 55-1. The write element 59-1 writes a sample pattern 70 on a platter 52 (not shown). Thereafter, the control module 31 increases the test current until the read element 59-2 moves to a position on the platter 52 where the read element 59-2 can read the sample pattern 70.

The offset d between the write element 59-1 and the read element 59-2 is generally a known design parameter specified by a manufacturer of the read/write device 59. Thus, the increase in the test current that produces a compression equal to d in the crashstop spring 55-1 provides a reasonable approximation of the spring constant $K_{spring}$ of the crashstop spring 55-1.

Based on the approximation, the control module 31 accurately calculates the value of the first current $I_{compression}$ with which to compress the crashstop spring 55-1. When the first current $I_{compression}$ thus calculated is applied and discontinued, the force exerted by the decompressing crashstop spring 55-1 on the actuator arm 58 may be sufficient to accelerate the actuator arm 58 to a predetermined target velocity.

Figure 6:
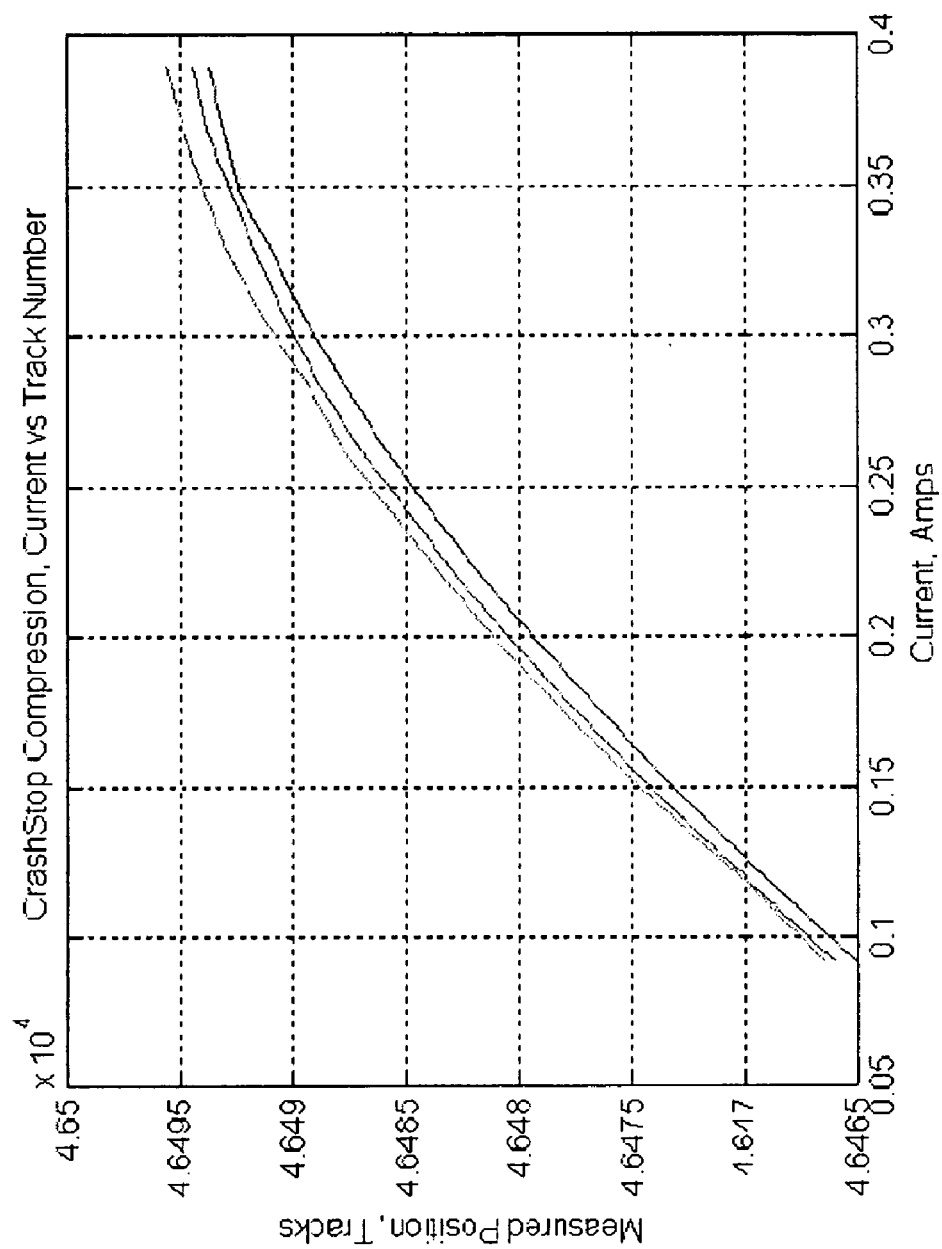
FIG. 6 is a graph of compression of a crashstop spring measured in number of tracks as a function of compression current used to compress the crashstop spring according to the present disclosure.

Referring now to FIG. 6, a graph of compression of the crashstop spring 55-1 is shown as a function of compression current $I_{compression}$.

$$w = \sqrt{(x^2 * K_{spring})/J}$$

Substituting $x=(K_t/K_{spring})*I_{compression}$, we get $$w=K_t*I_{compression}/\sqrt{J*K_{spring}}$$

From the angular velocity w, the linear velocity of the actuator arm 58 is given by the following equation.

Linear velocity=$w$*(Radius of read/write head)

Thus, the actuator arm 58 can be accelerated to a target velocity w by applying a first current equal to $I_{compression}$.

Crashstop springs 55-1 are typically designed for a specified amount of compressibility. Thus, spring force of crashstop springs 55-1 is knowable. Therefore, we can apply a known spring force to crashstop springs 55-1 based on a predetermined (intended) target velocity of the actuator arm 58. That is, the control module 31 can apply a proper value of first current $I_{compression}$ to the VCM 57 when compressing the crashstop spring 55-1 to achieve the predetermined target velocity of the actuator arm 58. In other words, the control module 31 can control the target velocity of the actuator arm 58 by controlling the value of the first current $I_{compression}$.

The spring constant $K_{spring}$ of the crashstop spring 55-1 partly determines the accuracy with which the first current $I_{compression}$ will generate a predetermined target velocity of the actuator arm 58. Therefore, calibrating the spring constant $K_{spring}$ may improve the accuracy of the system 100.

The spring constant $K_{spring}$ may be estimated by measuring an offset d between a write element 59-1 and a read element 59-2 in terms of Specifically, the graph shows three plots. Each plot shows a different measurement taken for the system 100. The graph indicates sufficient linearity of the crashstop spring 55-1.

Figure 7:
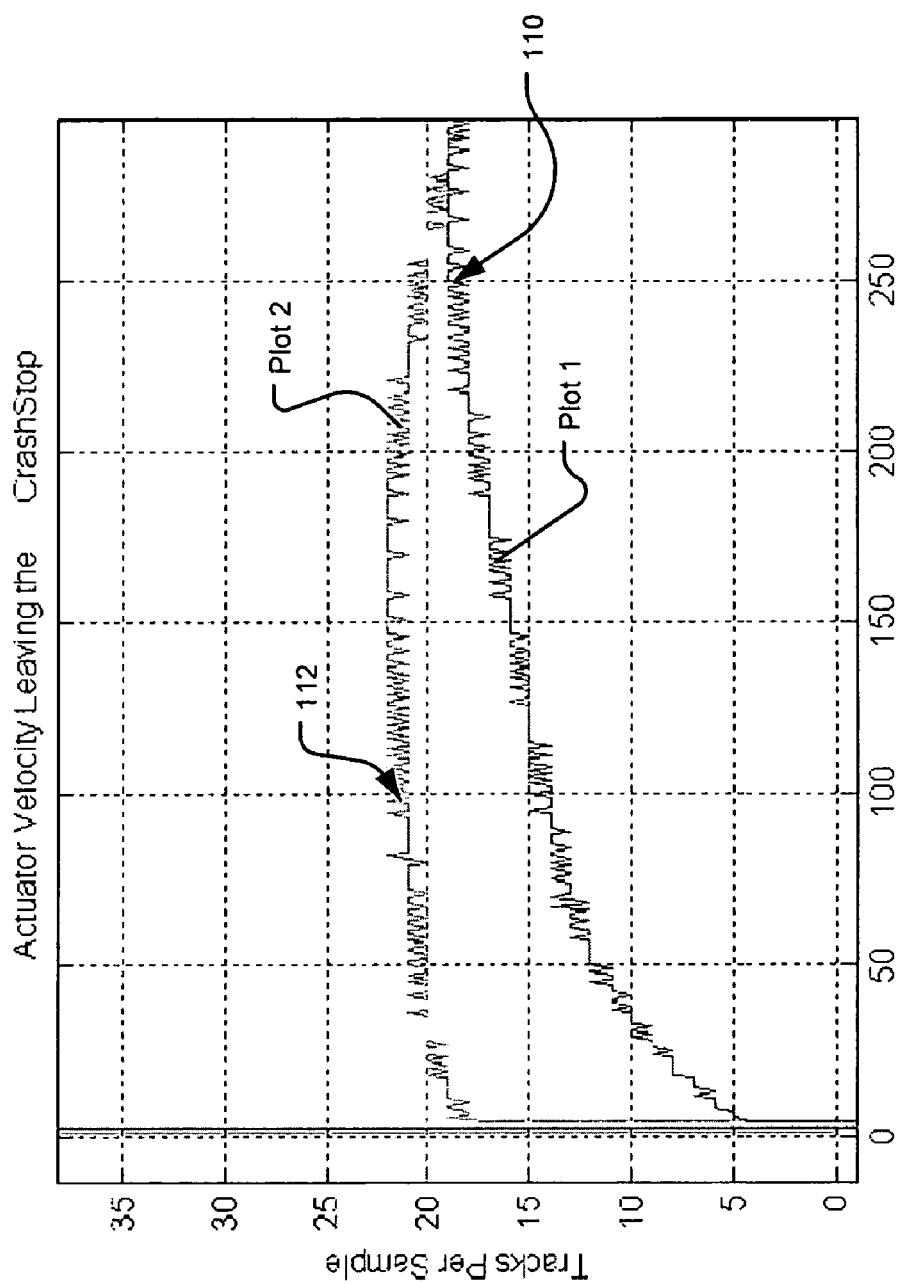
FIG. 7 is a graph of actuator velocity measured in number of tracks per sample as a function of time according to the present disclosure.

Referring now to FIG. 7, a graph of actuator velocity is shown as a function of time. For example, a target velocity of 20 tracks per sample is achieved in approximately 250 time units as shown at 110 in plot 1 when only bias current is used to accelerate the actuator arm 58. On the other hand, the target velocity of 20 tracks per sample is achieved in approximately 50 time units as shown at 112 in plot 2 when spring force of crashstop spring 55-1 is used in addition to the bias current to accelerate the actuator arm 58. As can be appreciated, the actuator arm 58 accelerates to the target velocity much faster when spring force is used than when spring force is not used.

Since spirals may be written from inner to outer diameters of platters 52 and/or vice versa, the system 100 may be implemented using springs of inner and/or outer crashstops. Additionally, the system 100 may be implemented by a hard disk controller (HDC) module that is arranged on a hard disk drive assembly (HDA) printed circuit board (PCB). Alternatively, the system 100 may be implemented by one or more modules arranged on a HDA.

Figure 8:
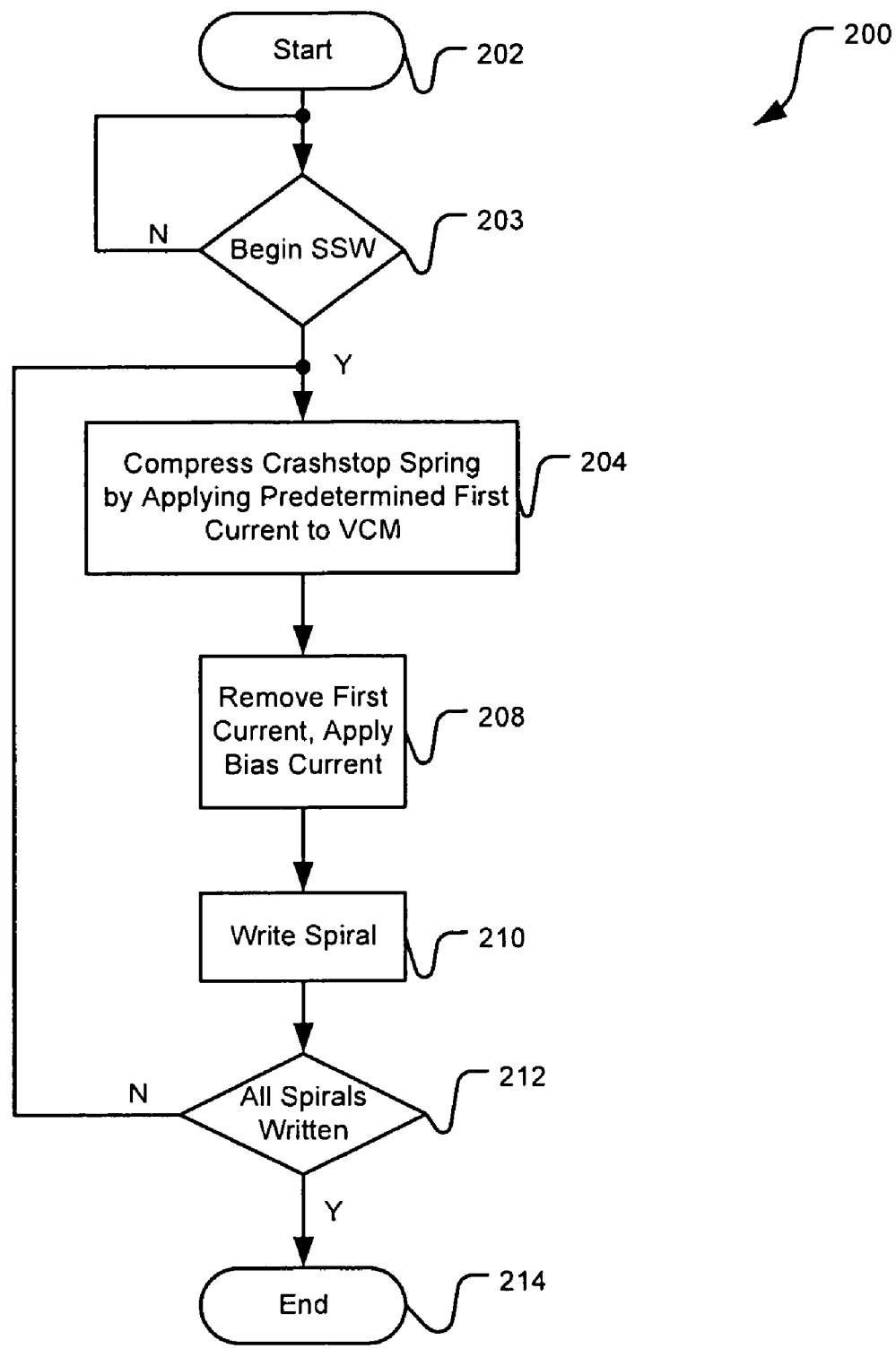
FIG. 8 is a flowchart of an exemplary method for accelerating an actuator arm when writing servo spirals according to the present disclosure.

Referring now to FIG. 8, a method 200 for writing servo spirals begins at step 202. A control module 31 determines in step 203 whether a SSW module 28 generated a control signal to indicate beginning of SSW. If false, the control module 31 waits. If true, the control module 31 compresses a crashstop spring 55-1 in step 204 by applying a predetermined first current to a voice coil motor (VCM) 57 so that an actuator arm 58 compresses a crashstop spring 55-1.

The control module 102 discontinues the first current in step 208, and simultaneously applies a second (bias) current to the VCM 57 so that the actuator arm 58 moves in the opposite direction, and the crashstop spring 55-1 decompresses. The force of the decompressing crashstop spring 55-1 accelerates the actuator arm 58 to a target velocity. The read/write head 59 mounted on the actuator arm 58 writes a spiral in step 210 while the actuator arm 58 accelerates and subsequently moves at the target velocity.

The control module 102 determines in step 212 if all spirals are written. If false, steps 204 through 212 are repeated. Otherwise, the method 200 ends in step 212

Figure 9:
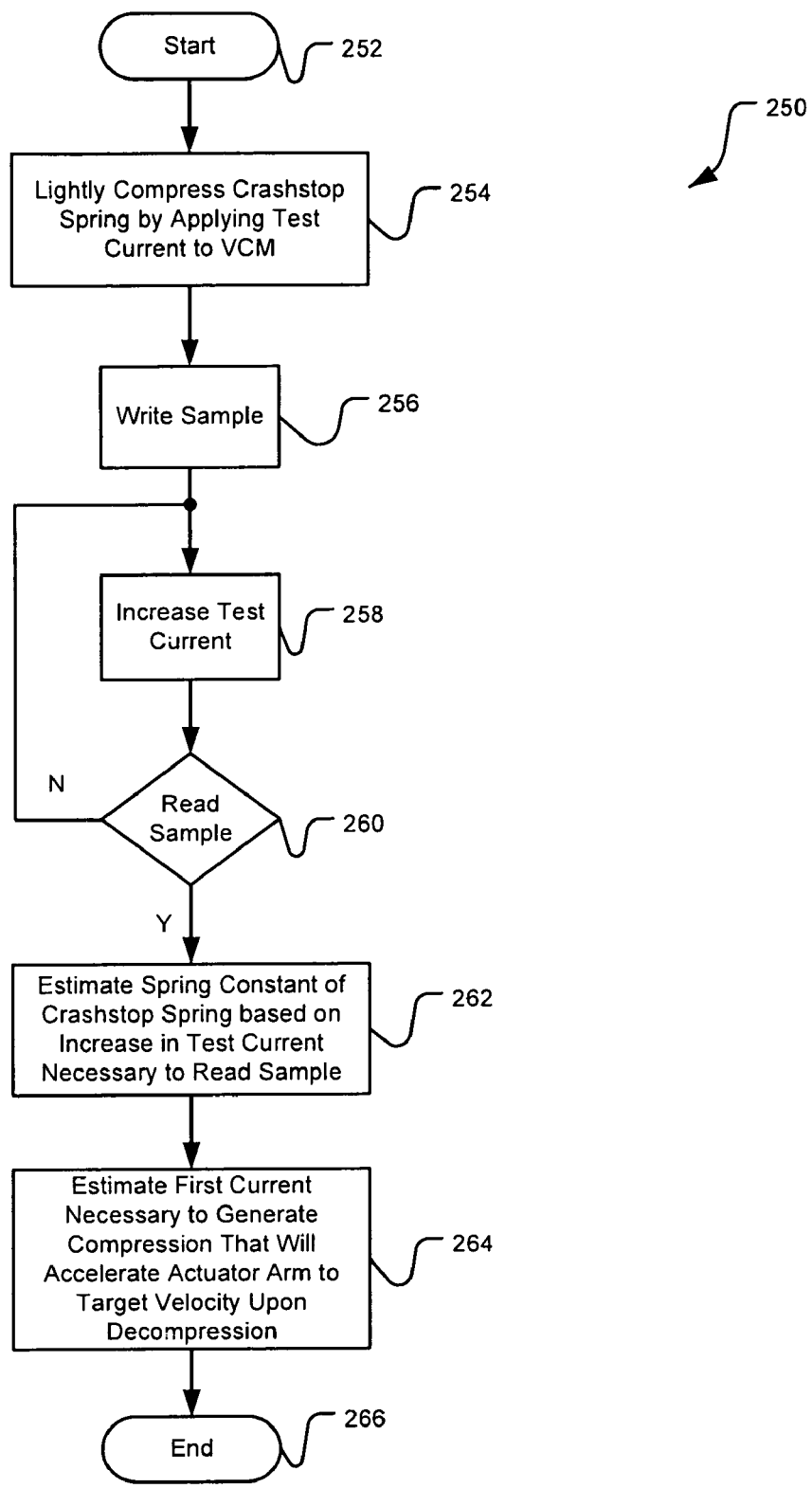
FIG. 9 is a flowchart of an exemplary method for calibrating a crashstop spring and calculating spring compression current to accelerate an actuator arm according to the present disclosure.

Referring now to FIG. 9, a method 250 for calibrating a spring constant of a crashstop spring 55-1 begins at step 252. A control module 31 lightly compresses the crashstop spring 55-1 in step 254 by applying a small test current to a voice coil motor (VCM) 57 that drives an actuator arm 58. While the actuator arm 58 lightly compresses the crashstop spring 55-1, a write element 59-1 writes a sample pattern on a platter 52 in step 258.

The control module 31 begins increasing the test current in step 260. The control module 31 increases the test current until the read element 59-2 can read the sample pattern in step 260. The control module 31 estimates the spring constant in step 262 based on the increase in test current that compresses the crashstop spring 55-1 by a known offset between the write element 59-1 and the read element 59-2. The control module 31 determines a first current in step 264 that can generate a compression sufficient to accelerate the actuator arm 58 to a predetermined target velocity upon decompression.

Figure 10A:
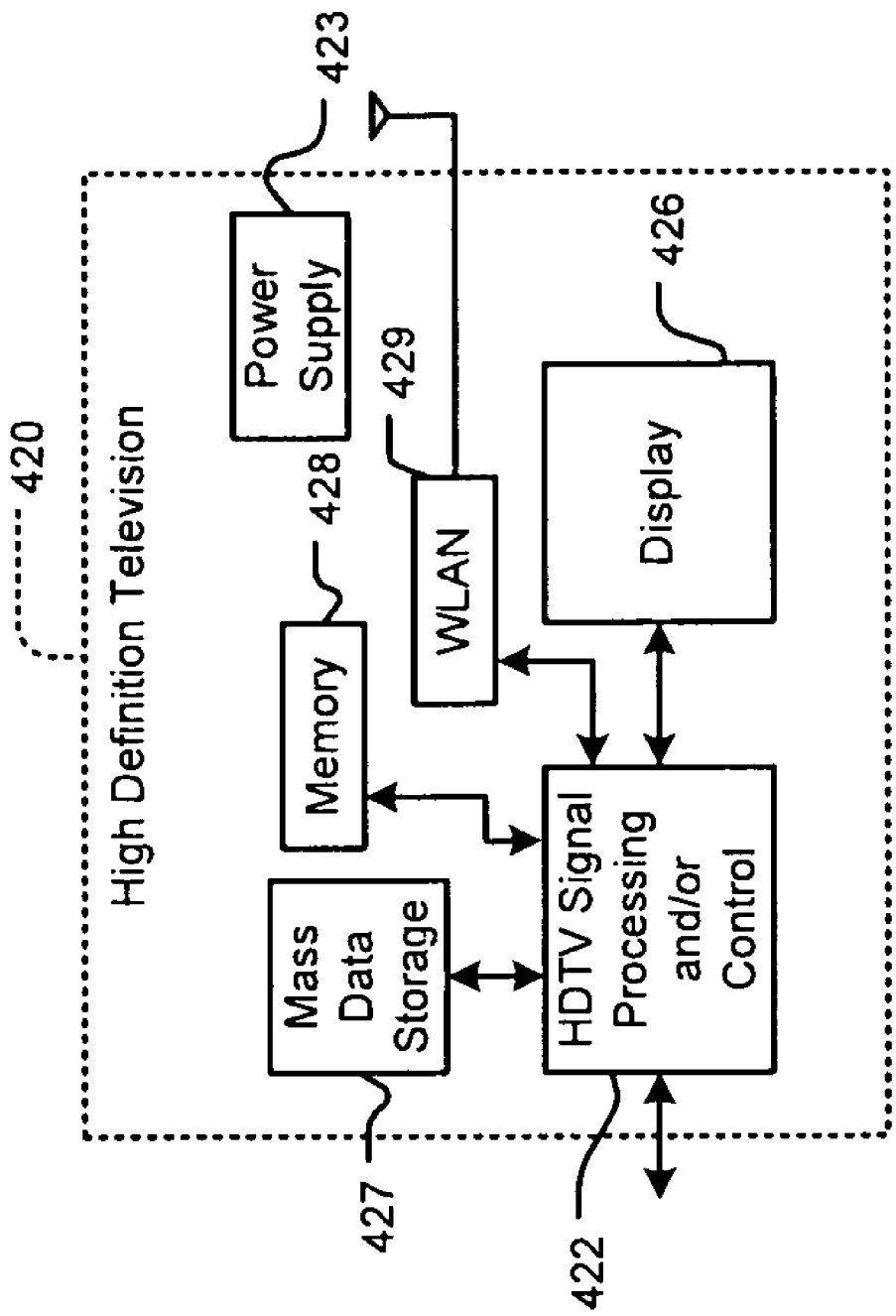
FIG. 10A is a functional block diagram of a high definition television.

Referring now to FIGS. 10A-10E, various exemplary implementations of the system 100 are shown. Referring now to FIG. 10A, the system 100 can be implemented in a mass data storage 427 of a high definition television (HDTV) 420. The HDTV 420 receives HDTV input signals in either a wireline or wireless format and generates HDTV output signals for a display 426. In some implementations, a signal processing circuit and/or a control circuit 422 and/or other circuits (not shown) of the HDTV 420 may process data, perform coding and/or encryption, perform calculations, format data and/or perform any other type of processing that the HDTV 420 may require.

The mass data storage 427 may store data in a nonvolatile manner. The mass data storage 427 may include optical and/or magnetic storage devices such as hard disk drives (HDDs) and/or digital versatile disk (DVD) drives. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 may support connections to a WLAN via a WLAN interface 429.

Figures 10B, 10C:
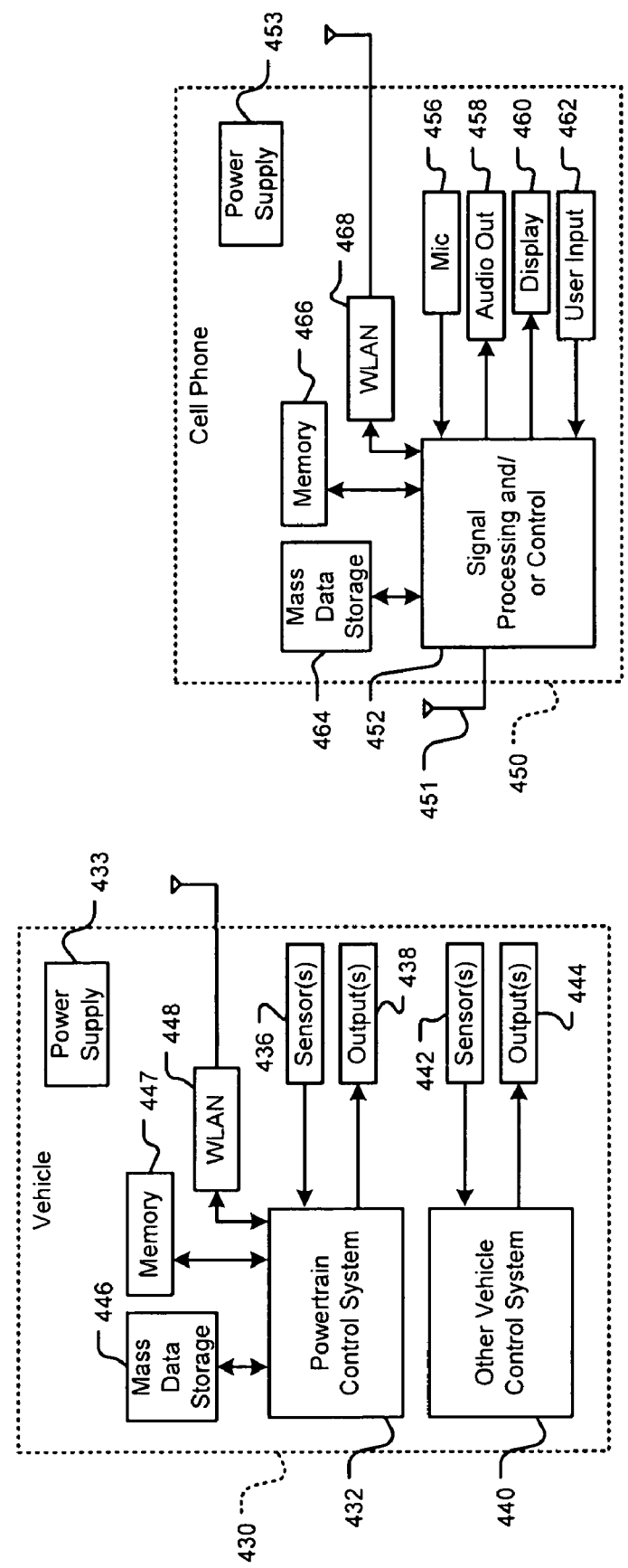
FIG. 10B is a functional block diagram of a vehicle control system.
FIG. 10C is a functional block diagram of a cellular phone.

Referring now to FIG. 10B, the system 100 may be implemented in a mass data storage 446 of a control system 430 of a vehicle. In some implementations, a powertrain control system 432 may receive inputs from one or more sensors such as temperature sensors, pressure sensors, rotational sensors, airflow sensors and/or any other suitable sensors. The powertrain control system 432 may generate one or more output control signals such as engine operating parameters, transmission operating parameters, and/or other control signals.

Other control systems 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, and a vehicle entertainment system such as a stereo, DVD, compact disc, etc. Still other implementations are contemplated.

The powertrain control system 432 may communicate with the mass data storage 446 that stores data in a nonvolatile manner. The mass data storage 446 may include optical and/or magnetic storage devices such as hard disk drives (HDDs)

and/or digital versatile disk (DVD) drives. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 may support connections to a WLAN via a WLAN interface 448. The control system 440 may also include mass data storage, memory and/or a WLAN interface (all not shown).

Referring now to FIG. 10C, the system 100 can be implemented in a mass data storage 464 of a cellular phone 450 that may include a cellular antenna 451. In some implementations, the cellular phone 450 may include a microphone 456, an audio output 458 such as a speaker and/or audio output jack, a display 460 and/or an input device 462 such as a keypad, a pointing device, and/or a voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with the mass data storage 464 that stores data in a nonvolatile manner. The mass data storage 464 may include optical and/or magnetic storage devices such as hard disk drives (HDDs) and/or digital versatile disk (DVD) drives. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 may support connections to a WLAN via a WLAN interface 468.

Figure 10D:
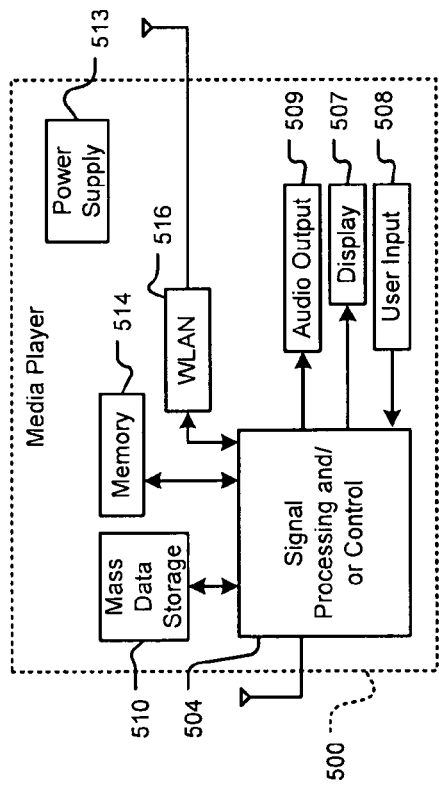
FIG. 10D is a functional block diagram of a set top box.

Referring now to FIG. 10D, the system 100 can be implemented in a mass data storage 490 of a set top box 480. The set top box 480 may receive signals from a source such as a broadband source and may output standard and/or high definition audio/video signals suitable for a display 488 such as a television and/or a monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with the mass data storage 490 that stores data in a nonvolatile manner. The mass data storage 490 may include optical and/or magnetic storage devices such as hard disk drives (HDDs) and/or digital versatile disk (DVD) drives. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 may support connections to a WLAN via a WLAN interface 496.

Figure 10E:
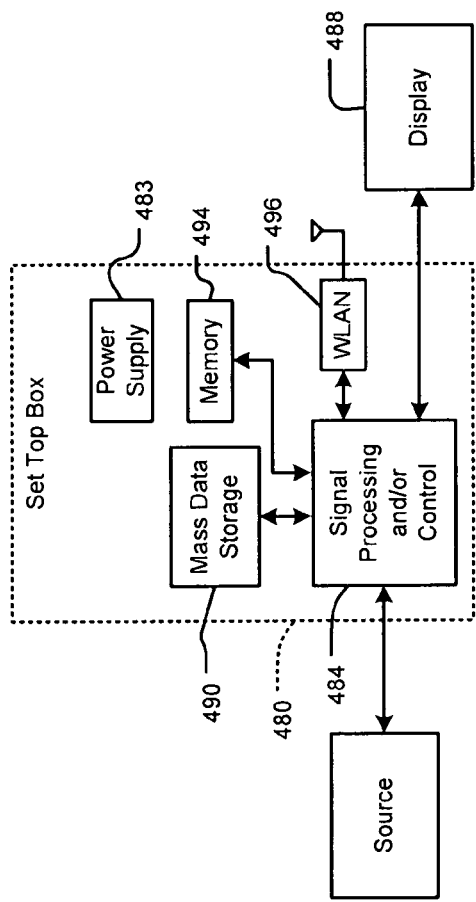
FIG. 10E is a functional block diagram of a media player.

Referring now to FIG. 10E, the system 100 can be implemented in a mass data storage 510 of a media player 500. In some implementations, the media player 500 includes a display 507 and/or a user input 508 such as a keypad, a touchpad, etc. In some implementations, the media player 500 may employ a graphical user interface (GUI) that typically employs menus, drop down menus, icons and/or a point-and-click interface via the display 507 and/or the user input 508. The media player 500 further includes an audio output 509 such as a speaker and/or an audio output jack. The signal processing and/or control circuits 504 and/or other circuits (not shown) of the media player 500 may process data, perform coding and/or encryption, perform calculations, format data and/or perform any other media player function.

The media player 500 may communicate with the mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices such as hard disk drives (HDDs) and/or digital versatile disk (DVD) drives. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 may support connections to a WLAN via a WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
a self-servo-write (SSW) module that generates servo signals and a control signal; and
a control module that generates a first current to bias an actuator arm against a spring when said control signal is received and that discontinues said first current to release said spring and accelerate said actuator arm when said SSW module generates said servo signals, wherein said control module further generates a second current that biases said actuator arm away from said spring when said first current is discontinued, and wherein said second current moves said actuator arm at a predetermined velocity after said actuator arm accelerates to said predetermined velocity.

2. The system of claim 1 wherein said spring exerts a force on said actuator arm when said spring is released.

3. The system of claim 2 wherein said force accelerates said actuator arm to a predetermined velocity.

4. The system of claim 1 wherein said second current is of opposite polarity relative to said first current.

5. The system of claim 1 wherein said first current is calculated based on a spring constant of said spring and a predetermined velocity that said actuator arm accelerates to when said spring is released.

6. The system of claim 1 wherein said actuator arm further comprises a read/write device that writes servo on a magnetic medium of a disk drive based on said servo signals while said actuator arm accelerates and subsequently moves at a predetermined velocity.

7. The system of claim 6 wherein said spring communicates with one of an inner diameter (ID) crashstop and an outer diameter (OD) crashstop and wherein said read/write device begins writing said servo adjacent to one of said ID crashstop and said OD crashstop.

8. The system of claim 6 wherein said read/write device comprises a read element and a write element, wherein said read element reads servo written by said write element.

9. The system of claim 8 wherein said read element is separated from said write element by a predetermined distance and wherein said control module calculates a spring constant of said spring based on current that biases said actuator arm against said spring by said predetermined distance.

10. The system of claim 1 further comprising a voice coil motor (VCM) that moves said actuator arm based on current applied by said control module.

11. A hard disk controller (HDC) module comprising the system of claim 1.

12. A hard disk assembly (HDA) comprising the system of claim 1.

13. A method, comprising:
generating servo signals and a control signal;
generating a first current to bias an actuator arm against a spring when said control signal is received;
discontinuing said first current to release said spring;
accelerating said actuator arm when said servo signals are generated; and
generating a second current to bias said actuator arm away from said spring when said first current is discontinued and moving said actuator arm at a predetermined velocity after said actuator arm accelerates to said predetermined velocity.

14. The method of claim 13 further comprising exerting a force on said actuator arm when said spring is released and accelerating said actuator arm to a predetermined velocity.

15. The method of claim 13 wherein said second current is of opposite polarity relative to said first current.

16. The method of claim 13 further comprising calculating said first current based on a spring constant of said spring and a predetermined velocity that said actuator arm accelerates to when said spring is released.

17. The method of claim 13 further comprising writing servo on a magnetic medium of a disk drive based on said servo signals while said actuator arm accelerates and subsequently moves at a predetermined velocity.

18. The method of claim 17 further comprising communicating between said spring and one of an inner diameter (ID) crashstop and an outer diameter (OD) crashstop and beginning writing said servo adjacent to one of said ID crashstop and said OD crashstop.

19. The method of claim 17 further comprising writing said servo with a write element, reading said servo with a read element, and calculating a spring constant of said spring based on current that biases said actuator arm against said spring by a predetermined distance that separates said read and write elements.

20. The method of claim 13 further comprising applying current to said actuator arm and moving said actuator arm based on said current.

21. A system, comprising:
self-servo-write (SSW) means for generating servo signals and a control signal; and
control means for generating a first current when said control signal is received and discontinuing said first current when said SSW means generates said servo signals, wherein said first current biases an actuator arm against spring means for accelerating said actuator arm, wherein said spring means releases and accelerates said actuator arm when said first current is discontinued, wherein said control means generates a second current that biases said actuator arm away from said spring means when said first current is discontinued, and wherein said second current moves said actuator arm at a predetermined velocity after said actuator arm accelerates to said predetermined velocity.

22. The system of claim 21 wherein said spring means exerts a force on said actuator arm when said spring means is released and wherein said force accelerates said actuator arm to a predetermined velocity.

23. The system of claim 21 wherein said second current is of opposite polarity relative to said first current.

24. The system of claim 21 wherein said first current is calculated based on a spring constant of said spring means and a predetermined velocity that said actuator arm accelerates to when said spring means is released.

25. The system of claim 21 wherein said actuator arm comprises write means for writing servo on a magnetic medium of a disk drive based on said servo signals while said actuator arm accelerates and subsequently moves at a predetermined velocity.

26. The system of claim 25 further comprising an inner diameter (ID) crashstop means for preventing said actuator arm from moving beyond said ID and an outer diameter (OD) crashstop means for preventing said actuator arm from moving beyond said OD, wherein said spring means communicates with one of said ID and OD crashstop means, and wherein said read/write device begins writing said servo adjacent to one of said ID and OD crashstop means.

27. The system of claim 25 wherein said actuator arm further comprises read means for reading said servo, and wherein said read means is separated from said write means by a predetermined distance.

28. The system of claim 27 wherein said control means calculates a spring constant of said spring means based on current that biases said actuator arm against said spring by said predetermined distance.

29. The system of claim 21 further comprising voice coil motor (VCM) means for moving said actuator arm based on current applied by said control means.

30. A hard disk controller (HDC) means for controlling a hard disk, wherein said HDC means comprises the system of claim 21.

31. A hard disk assembly (HDA) comprising the system of claim 21.

* * * * *

UNITED STATES PATENT AND TRADEMARK OFFICE
CERTIFICATE OF CORRECTION

PATENT NO. : 7,471,482 B2
APPLICATION NO. : 11/541977
DATED : December 30, 2008
INVENTOR(S) : Rutherford Page 1 of 1

It is certified that error appears in the above-identified patent and that said Letters Patent is hereby corrected as shown below:

Column 8, Lines 36-65     Delete "current" through "$I_{compression}$" and insert lines 67 of Column 8 and Lines 1-30 of Column 9 through "in terms of"

Column 8-9, Lines 67 of Column 8 and 1-30 of Column 9     Delete the equation on line 67 of patent through "in terms of" in Line 30 of Column 9 and insert it after "we get" in Column 8 at Line 36

Signed and Sealed this

Thirty-first Day of August, 2010

David J. Kappos
*Director of the United States Patent and Trademark Office*